United States Patent [19]

Murphy, Jr. et al.

[11] Patent Number: 5,040,420
[45] Date of Patent: Aug. 20, 1991

[54] PRESSURE RESPONSIVE SENDING UNIT

[75] Inventors: Frank W. Murphy, Jr.; Lewis M. Carlton; Oren D. Moffett, all of Tulsa, Okla.

[73] Assignee: Murphy Management, Inc., Tulsa, Okla. ; a part interest

[21] Appl. No.: 326,669

[22] Filed: Mar. 21, 1989

[51] Int. Cl.⁵ .............................................. G01L 9/02
[52] U.S. Cl. ..................................... 73/725; 73/723; 338/42
[58] Field of Search ................. 73/725, 717, 719, 723, 73/179, 181; 338/4, 42; 340/977

[56] References Cited

U.S. PATENT DOCUMENTS

| | | | |
|---|---|---|---|
| 3,111,033 | 11/1963 | Muzzi | 73/725 |
| 3,225,595 | 12/1965 | Dotto | 73/725 |
| 3,314,061 | 4/1967 | Magagnos | 340/977 |
| 3,369,397 | 2/1968 | Alth | 73/179 |
| 3,375,718 | 4/1968 | Robinson et al. | 116/271 |
| 3,916,185 | 10/1975 | Jehly | 340/977 |
| 4,361,048 | 11/1982 | Hüttinger | 116/266 |
| 4,718,278 | 1/1988 | Bergsma | 73/725 |
| 4,817,419 | 4/1989 | Iden | 73/725 |

Primary Examiner—Joseph A. Orsino
Assistant Examiner—Brent Swarthout
Attorney, Agent, or Firm—Kimmel, Crowell & Weaver

[57] ABSTRACT

A condition responsive sending and indicating unit for sensing a condition and transmitting a signal representative of the sensed condition to an indicator at a remote location. The sending unit includes indicia for giving an indication of the sensed condition at the site of the unit, and has a movable contact operatively associated with a variable resistor in circuit with the remote indicator, whereby a variable signal is produced in response to variation in the sensed condition. Calibration of the unit is accomplished by adjustment of the set point of the movable means, and by adjustment of the position of the resistor relative to the movable contact.

9 Claims, 3 Drawing Sheets

PRESSURE RESPONSIVE SENDING UNIT

FIELD OF THE INVENTION

This invention relates generally to pressure responsive indicator devices, and more particularly to a pressure responsive indicator device or gauge which additionally functions as a sending unit to transmit a signal to a remote location.

DESCRIPTION OF THE PRIOR ART

Pressure responsive, variable resistance sensing devices are currently available, as are pressure responsive gauges or indicator devices. A major problem with currently available pressure responsive variable resistance sending units is inaccuracy of the output signal due to the lack of adjustable calibration means for the unit.

Applicant's prior patent U.S. Pat. No. 3,375,718 describes an accurate pressure responsive sending unit in which an adjustable calibration is provided to adjust or recalibrate the instrument as measured or checked against a master pressure gauge. This adjustment is achieved by screw 72 and bridge 58, which alter the position of the bell crank relative to the position of the diaphragm. In this patent, the output of the device is indicated on a dial carried by the instrument.

There exists a need for an instrument which not only accurately senses and indicates pressure, but which is also capable of sending a signal representative of the sensed pressure to a remote location.

SUMMARY OF THE INVENTION

Accordingly, it is an object of the present invention to provide a pressure responsive sending unit which has adjustable calibration means for improved accuracy.

Another object of the invention is to provide a pressure responsive sending unit which accurately senses a pressure and sends an electrical signal representative of the sensed pressure to a remote location.

A further object is to provide a pressure responsive sending unit which is operative to send a signal indicative of the sensed pressure to a remote location, and which has indicator means for providing an indication of the sensed pressure at the site of the pressure being sensed.

Yet another object of the invention is to provide a sending unit for sensing a condition and sending a signal indicative of the sensed condition to a remote location, and in which a movable contact is associated with a variable resistance device to provide a variable resistance and thus a variable signal in response to the sensed condition, the relative positions of the resistance device and the movable contact being adjustable for calibrating the instrument and for varying its sensitivity.

In accordance with the present invention, a pressure responsive device has a means for connection to a pressure to be measured or sensed, and includes an adjustable calibration means for calibrating the device. A variable resistance winding or thin film resistor or other suitable variable resistance means is provided in the device and a wiper or movable contact is connected to move across the winding or thin film resistor or other resistance device in response to the sensed pressure. Electrical leads extend from the device to a remote location for conducting a signal to a gauge at the remote location. Variation in the sensed pressure causes the movable contact to move across the resistance device, varying the resistance in the circuit and obtaining a signal indicative of the sensed pressure.

In addition to the calibration means for adjusting the calibration of the pressure responsive unit, the winding or thin film resistor, or other suitable variable resistance device, may also be adjustably moved in plural directions to vary the neutral or set point of the movable contact relative to the resistor and to vary the sensitivity or rate of response of the unit to changes in sensed pressure. Further, indicia may be provided on the housing for the pressure responsive unit so that a visual indication of the pressure variations can be available at the site of the sensed pressure. By altering the connections of the resistance element in the circuit, the device can be made to have either an increasing or a decreasing resistance upon an increase in sensed pressure.

BRIEF DESCRIPTION OF THE DRAWINGS

The foregoing and other objects and advantages of the invention will become apparent from the following detailed description and accompanying drawings, in which like reference characters designate like parts throughout the several views, and wherein:

FIG. 11 is a top plan view of a thin film resistor of known construction, suitable for use in the device of the invention in place of the coil wound resistance element shown in the foregoing figures.

DETAILED DESCRIPTION OF THE PREFERRED EMBODIMENTS

Figure 1:
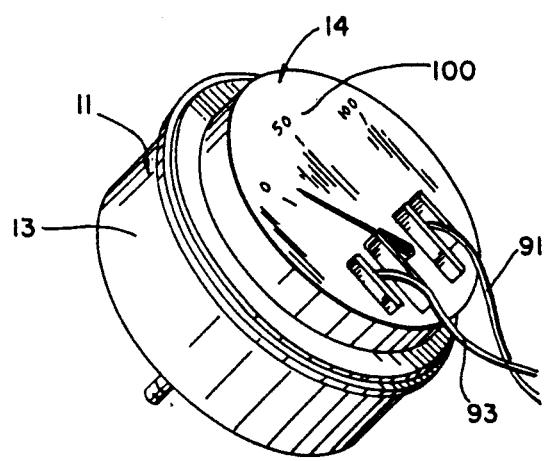
FIG. 1 is a top perspective view of the pressure responsive sending unit of the invention.
Figure 2:
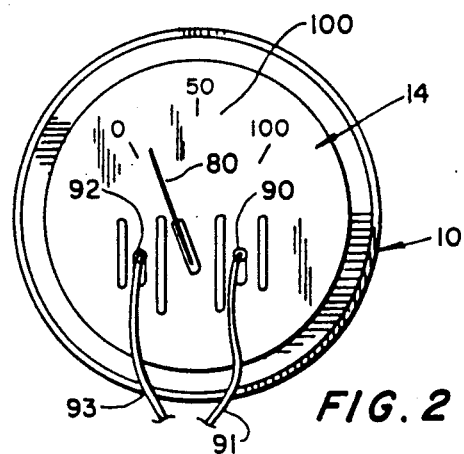
FIG. 2 is a top plan view of the device of the invention.
Figure 3:
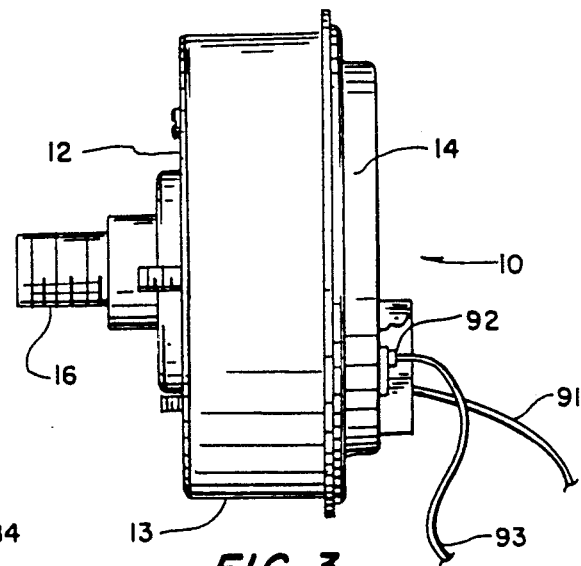
FIG. 3 is a side view in elevation of the device of the invention.
Figure 4:
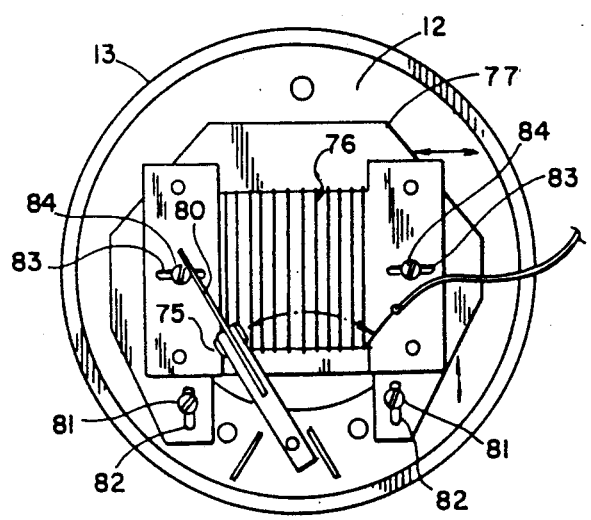
FIG. 4 is a top plan view of the device of the invention, with the cover removed.
Figure 5:
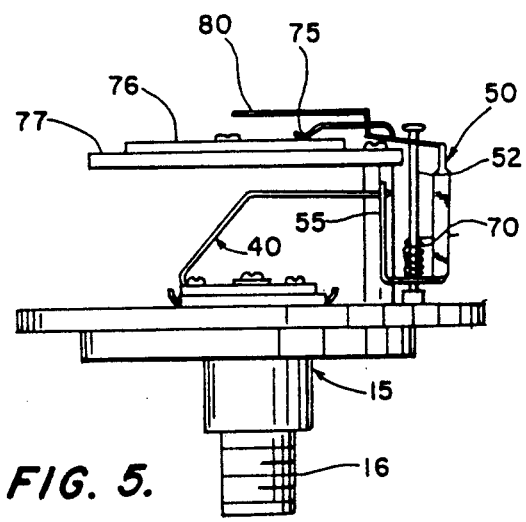
FIG. 5 is a side view in elevation of the device of the invention removed from its housing.
Figure 6:
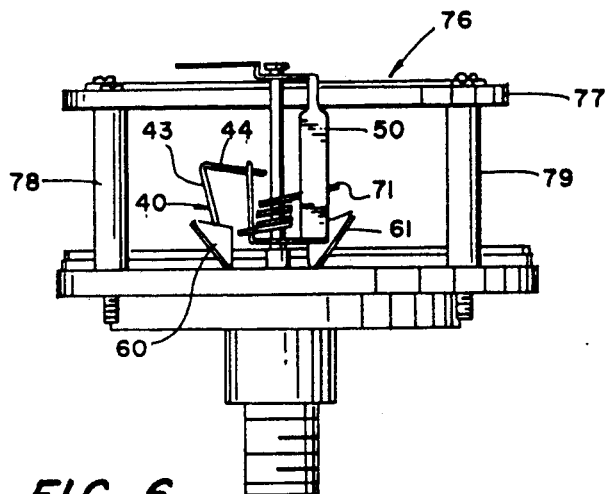
FIG. 6 is a front view in elevation of the device of the invention removed from its housing.

Referring more specifically to the drawings, the pressure responsive sending unit of the invention is indicated generally at 10 in FIGS. 1–3. The unit comprises a housing or case 11 having an apertured bottom wall 12 and an upstanding cylindrical side wall 13. A transparent cover 14 is secured over the open end of the side wall.

A pressure responsive element or component 15 is secured within the housing and includes a threaded connector 16 with an orifice 17 extending therethrough. The connector terminates in a radially enlarged annular wall 18 with an upstanding shoulder 19 on the outer periphery thereof. A diaphragm 20 is clamped at its outer periphery between the shoulder 19 and the bottom of a fixed plate 21 secured on top of the connector, and is moved or flexed in response to pressure sensed through the orifice 17. A diaphragm button 22 is engaged at one end against the diaphragm and is slidable through an aperture 23 in the plate 21.

Spring plate 30 is secured over the plate 21 in spanning relationship to the recessed area 31 through which the button 22 reciprocates, and includes a reduced width end portion 32 and a base end 33. The base end 33 is fixedly secured to the top of the plate 21, while the end 32 is adjustable toward and away from the plate via screw 34. Spring arm 35 and pivot supports 36 and 37 are secured on top of the spring plate, with the free end 38 of spring arm 35 disposed in overlying relationship to the button 22. Thus, as the pressure in orifice 17 increases, the diaphragm 20 flexes upwardly, causing the button 22 to extend further through the opening 23 and thereby engaging and pushing up on spring arm 35. Calibration or adjustment of the spring plate can be accomplished by adjusting the screw 34.

Figure 9:
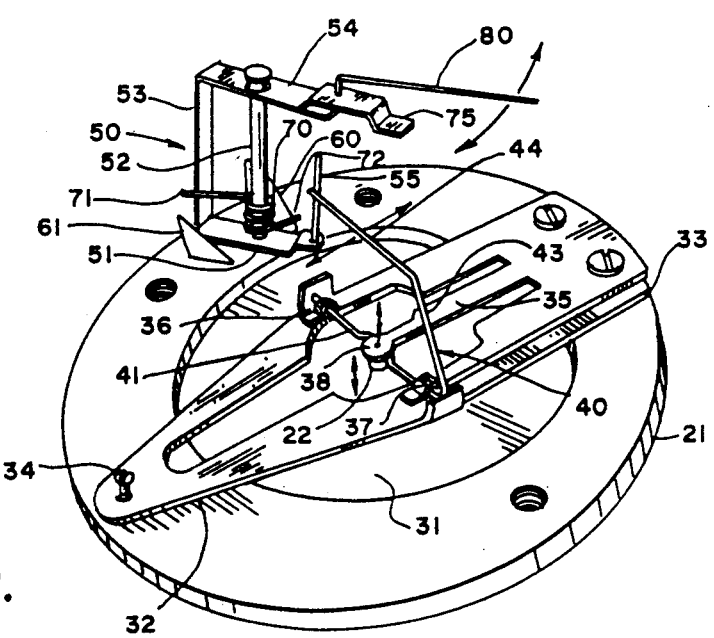
FIG. 9 is an enlarged top perspective view of the pressure responsive component and movable contact used in the device of the invention.

A crank arm 40 has one end 41 pivotally supported by the pivot supports 36 and 37, and includes an offset portion 42 between the pivot supports and in alignment with the button 22, whereby as the button is extended upwardly through the opening 23 it engages the offset portion 42 and causes the crank arm to pivot or rotate about its axis. This causes the angularly extending portions 43 and 44 to swing or move laterally as indicated by the arrows in FIG. 9.

Pointer mechanism 50 is pivoted on top of the plate 21 at one side thereof and comprises a generally U-shaped structure having a first horizontal arm 51 pivotally engaged on pivot shaft 52, a vertically extending portion 53 and a second horizontal arm 54 spaced above the first arm 51 and also pivotally engaged on pivot shaft 52. A pointer pin 55 extends upwardly from the free end of the first arm 51 into a position of engagement with the upper free end of the crank arm 40, 44.

Stops 60 and 61 are provided on top of the plate 21 at either side of the pointer mechanism 50 to contact and thereby limit the pivoting movement of the pointer between two extremes as defined by the stops.

Coil spring 70 is disposed around the pivot shaft 52 and has one end 71 thereof engaged against the vertically extending portion 53 of the pointer and the other end 72 engaged against the stop 60, whereby the pointer is biased in a clockwise direction as viewed from the top. However, the spring arm 35, acting through the crank arm 40, holds the pointer to the counter-clockwise position against stop 61, as shown in the figures.

As seen best in FIGS. 4, 5, 6 and 9, a wiper or contact 75 is carried on the outer end of the second horizontal arm 54 of pointer 50 for wiping engagement across a wire wound resistance element 76 supported on top of a support platform 77 mounted on top of a pair of upright stanchions 78 and 79. A needle or pointer 80 is secured to the arm 54 and projects substantially beyond the end of the arm 54.

The support platform 77 is secured on top of the stanchions via screws 81 and slots 82, whereby the support platform may be moved laterally relative to the plate 21 and the pivot shaft 52, and wire wound resistance element 76 is secured on top of the support platform via slots 83 and screws 84, whereby the resistance element may be moved laterally from side to side on the support platform. Thus, the resistance element may be moved in plural directions relative to the pivot shaft 52 for adjusting the zero or set point of the pointer relative to the winding (side-to-side movement of the resistance element via slots 83), and the sensitivity or rate of response of the pointer to pressure changes may be adjusted via slots 82 by moving the support platform and thus the resistance winding toward and away from the pivot shaft.

Figure 7:
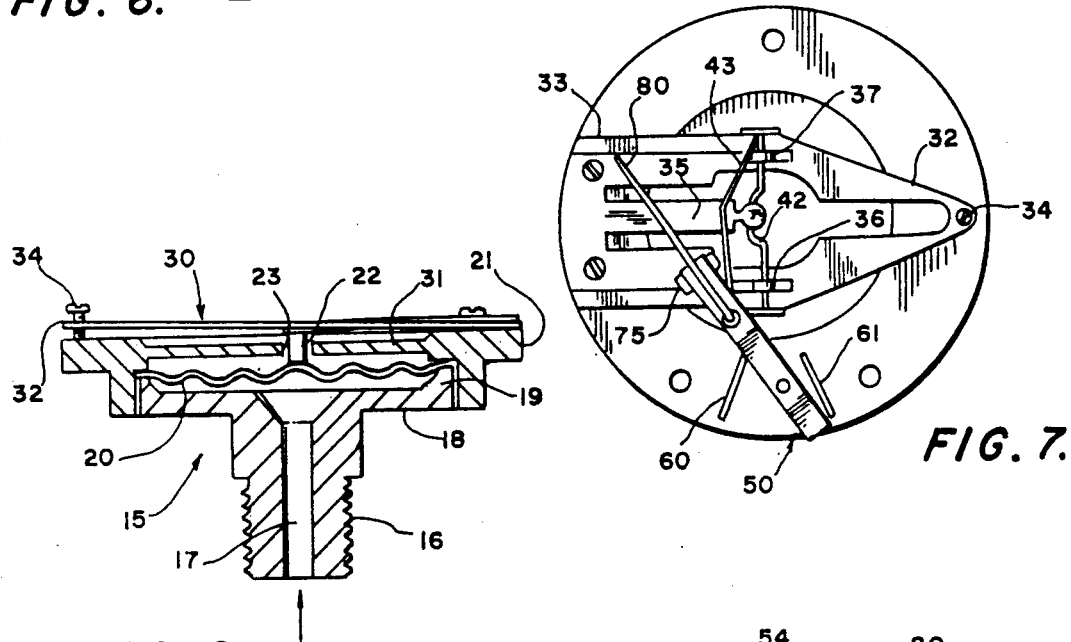
FIG. 7 is a top plan view of the device of the invention, with the housing and winding removed.
Figure 8:
FIG. 8 is an enlarged vertical sectional view of the pressure responsive component from the device of the invention.
Figure 10:
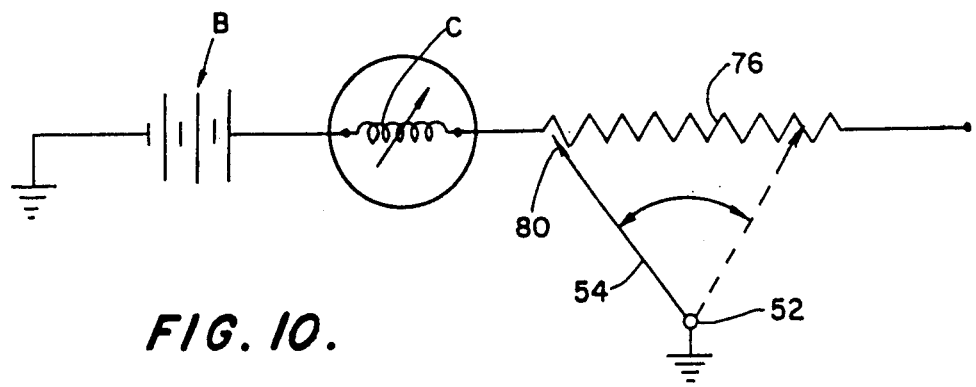
FIG. 10 is a schematic wiring diagram for the signal sending portion of the device of the invention.
Figure 11:
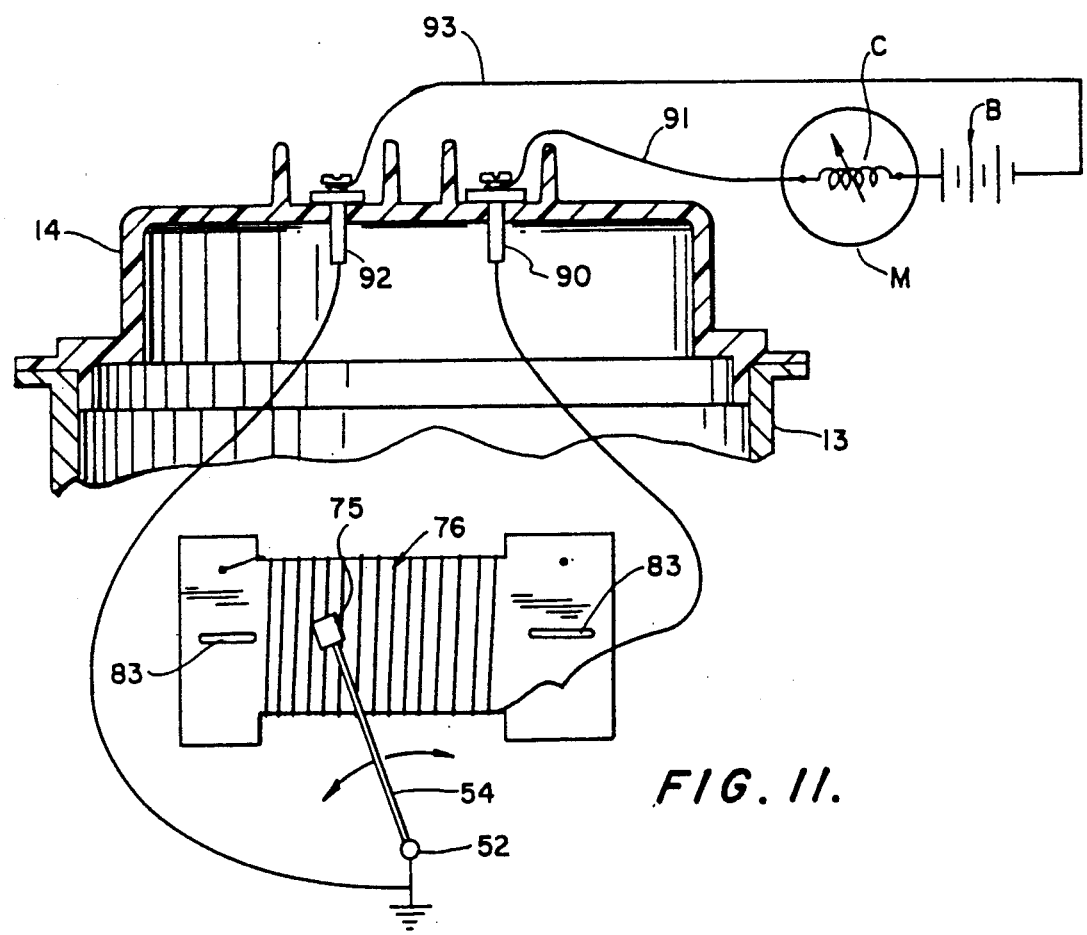
FIG. 11 is a somewhat schematic, fragmentary sectional view of the cover and electrical components used in the device of the invention.

In its simplest form, the pressure responsive sending unit of the invention could be used in a battery driven d'Arsonval type meter movement circuit. Thus, with reference to FIGS. 10 and 11, a suitable battery B (12 volt automobile battery, for example) is connected with one side of the meter movement coil C. The other side of the coil is connected with one leg or end of the coil wound resistor 76, and the circuit is completed through the wiper contact 75 to ground. At zero or predetermined low pressure input, a low (33 ohms typical) resistance exists in the circuit and the wiper and pointer are in the counterclockwise position indicated in FIGS. 2, 4 and 7. As pressure is increased, the diaphragm pushes the button 22 upwardly against the resistance of the spring arm 35, rotating the crank arm and causing the pointer mechanism to pivot about pivot shaft 52, moving wiper contact 75 across the resistance element and increasing the resistance in the circuit to a maximum value of 240 ohms (typical). Since one end of the resistance element is connected through a terminal 90 and wire 91 with meter M, and the pointer or contact 80 is connected through terminal 92 and wire 93 to the other end of the meter, the device of the invention enables an indication to be obtained on an electrical meter for a condition (pressure) at a remote location. For instance, the pressure responsive device could be mounted in operative association with the oil pressure galley in an automobile and wired to a gauge or meter on the instrument panel. The gauge or meter (voltmeter) would be calibrated in pounds per square inch and would thus indicate the oil pressure sensed at the remotely located sending unit.

An alternative arrangement to the above can be obtained by causing the resistance to be decreased as the amount of pressure sensed is increased. This is achieved by simply connecting the meter to the opposite end of the wire wound coil resistance element to that shown in FIGS. 10 and 11. This arrangement would be used, for example, in association with some commercially available European meter movements.

Further, in some instances it is desirable to provide an indication at the point of mounting of the sending unit of the pressure or other condition being sensed. This is accomplished in the present invention by providing suitable indicia 100 (FIGS. 1 and 2) on the transparent cover 14, or by providing indicia on the mounting structure above the wire wound resistor. The pointer 80 carried on the arm 54 would then cooperate with the indicia to give a visual indication of the sensed condition.

A further variation (not shown) could be obtained by removing the battery ground and the pivot connection ground as shown in the drawings and using an ungrounded circuit. This type circuit might be required, for example, in marine applications where electrolysis is a factor.

Figure 12:
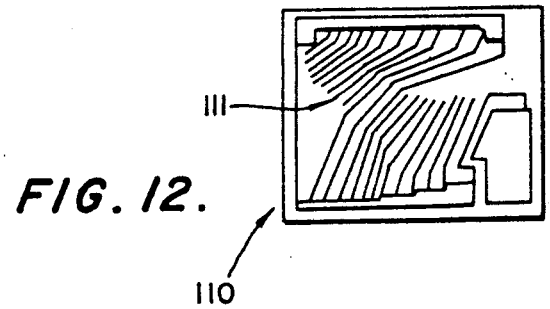

Additionally, a thin film resistance element 110, as shown in FIG. 12, or other suitable resistance element could be used in place of the coil wound resistor 76, if desired. The thin film resistance element 110 occupies less space than the wire wound resistance element 76 and possesses other advantages apparent to those skilled in the art, including cost. In operation, the thin film resistance element functions identically to the coil wound resistor, i.e., the movable contact 75 slides across the arcuately shaped midportion 111, thereby varying the resistance offered by the element 110, and it may be adjusted for accuracy, etc., in the same way as the coil wound resistor.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

We claim:

1. A condition responsive sending unit for sensing a condition and simultaneously giving an indication of the sensed condition and transmitting a signal indicative of the sensed condition to a remote location, comprising:
    a transducer for producing movement of a first element in response to a sensed condition;
    an indicator including a second movable element;
    variable resistance means electrically connected with a source of electrical energy and with a remotely located indicator for obtaining a variable electrical signal in response to movement of said second movable element to obtain a remote indication of the sensed condition, said variable resistance means including a movable contact carried by said second movable element;
    means for adjusting the position of the variable resistance means in a first direction, to adjust the electrical signal level at a given level of the sensed condition of the sending unit, and in a second direction, transverse to the first direction, to adjust the rate of electrical response of the sending unit; and
    means for calibrating said transducer.

2. A condition responsive sending unit as claimed in claim 1, wherein:
    said first element is linearly movable in response to said sensed condition, a spring arm engaged with said first element for urging the first movable element to an initial at-rest position; and
    said calibrating means includes adjustable means for adjusting the at-rest position of the first element.

3. A condition responsive sending unit as claimed in claim 2, wherein:
    said second movable element comprises a movable arm connected through linkage means to be moved upon movement of said first element; and
    said variable resistance means comprises a variable resistance element and a movable contact carried by said movable arm for movement across said variable resistance element.

4. A condition responsive sending unit as claimed in claim 3, wherein:
    second movable element comprises a pivoted arm positioned for pivoting movement across said variable resistance element; and
    said variable resistance element comprises a wire wound resistor supported for adjustable movement in both a side-to-side direction and a fore-and-aft direction, thereby enabling the set point of said variable resistance element relative to said contact to be adjusted and also enabling the sensitivity or rate of response of said movable contact on said variable resistance element to be adjusted with respect to the condition being sensed.

5. A condition responsive sending unit as claimed in claim 4, wherein:
    a pointer is carried by said movable arm; and
    a transparent cover is secured on said unit, said cover having indicia thereon for indicating the condition being sensed at said unit.

6. A condition responsive sending unit as claimed in claim 5, wherein:
    the condition being sensed is pressure, and said first element includes a diaphragm movable in response to the sensed pressure.

7. A condition responsive sending unit for sensing a condition and simultaneously giving an indication of the sensed condition and transmitting a signal indicative of the sensed condition to a remote location, comprising:
    a housing having a fixed plate with an opening therein;
    a transducer comprising a pin mounted for reciprocal movement through said opening, means for producing movement of said pin in response to a sensed condition, and a spring arm engaged with the pin for urging the pin toward an at-rest position;
    a movable indicator arm connected through linkage means to said pin, for indicating the sensed condition at the site of the sending unit;
    a variable resistance element electrically connected with a source of electrical energy and a remotely located indicator, for obtaining a variable electrical signal in response to movement of said pin;
    a movable contact carried by said movable arm for movement across said variable resistance element;
    adjustment means connected with said variable resistance means for adjusting the position of the variable resistance means in a first direction to adjust the set point of the sending unit, and for adjusting the position of the variable resistance means in a second direction transverse to said first direction to adjust the rate of response of the sending unit; and
    means for calibrating said condition responsive sending unit.

8. A condition responsive sending unit as claimed in claim 4, wherein:
    said sending unit includes a housing having a fixed plate; and
    said variable resistance element is adjustably supported for movement in said side-to-side direction on a mounting plate carried by said fixed plate, said mounting plate being adjustably supported, in turn, on said fixed plate for movement in said fore-and-aft direction.

9. A condition responsive sending unit as claimed in claim 8, wherein:
    said spring arm is fixed at one end to said fixed plate and an adjustment screw extends through the other end of the spring arm and into contact with the fixed plate whereby the spacing of the spring arm relative to the fixed plate may be adjusted for thereby adjusting the initial bias imposed by the spring arm on said first element.

* * * * *